United States Patent
Cooperman et al.

(10) Patent No.: US 9,064,424 B2
(45) Date of Patent: Jun. 23, 2015

(54) AUDIOVISUAL RECORD OF A USER READING A BOOK ALOUD FOR PLAYBACK WITH A VIRTUAL BOOK

(75) Inventors: Hillel Cooperman, Seattle, WA (US); Jenny Lam, Seattle, WA (US); Walter Smith, Seattle, WA (US)

(73) Assignee: Jackson Fish Market, LLC, Seattle, WA (US)

( * ) Notice: Subject to any disclaimer, the term of this patent is extended or adjusted under 35 U.S.C. 154(b) by 1087 days.

(21) Appl. No.: 12/709,341

(22) Filed: Feb. 19, 2010

(65) Prior Publication Data

US 2010/0216108 A1 Aug. 26, 2010

Related U.S. Application Data

(60) Provisional application No. 61/154,283, filed on Feb. 20, 2009.

(51) Int. Cl.
*G09B 5/06* (2006.01)

(52) U.S. Cl.
CPC .................................... *G09B 5/062* (2013.01)

(58) Field of Classification Search
USPC ........................................................ 434/317
See application file for complete search history.

(56) References Cited

U.S. PATENT DOCUMENTS

| | | | |
|---|---|---|---|
| 5,957,697 A * | 9/1999 | Iggulden et al. ............... | 434/317 |
| 6,633,741 B1 | 10/2003 | Posa et al. | |
| 6,933,928 B1 | 8/2005 | Lilienthal | |
| 7,020,663 B2 | 3/2006 | Hay et al. | |
| 7,304,635 B2 * | 12/2007 | Seet et al. ...................... | 345/156 |
| 7,401,286 B1 | 7/2008 | Hendricks et al. | |
| 8,095,949 B1 * | 1/2012 | Hendricks et al. .............. | 725/29 |
| 2002/0091793 A1 | 7/2002 | Sagie | |
| 2002/0133350 A1 | 9/2002 | Cogliano | |
| 2003/0018663 A1 | 1/2003 | Cornette et al. | |
| 2003/0118979 A1 | 6/2003 | Axelrod | |
| 2004/0015360 A1 | 1/2004 | Calabrese | |
| 2004/0090390 A1 | 5/2004 | Mason et al. | |
| 2006/0194181 A1 | 8/2006 | Rosenberg | |
| 2007/0133940 A1 | 6/2007 | Freeman | |
| 2007/0168413 A1 | 7/2007 | Barletta et al. | |
| 2008/0022223 A1 | 1/2008 | Seet et al. | |
| 2009/0047647 A1 | 2/2009 | Welch | |
| 2009/0225788 A1 | 9/2009 | Kephart et al. | |
| 2009/0228279 A1 | 9/2009 | Kephart et al. | |
| 2009/0228493 A1 * | 9/2009 | Kephart et al. ................. | 707/10 |
| 2009/0228798 A1 * | 9/2009 | Kephart et al. ............... | 715/727 |
| 2009/0235162 A1 | 9/2009 | Nuccio et al. | |
| 2009/0295734 A1 * | 12/2009 | Hendrickson et al. ......... | 345/169 |

OTHER PUBLICATIONS

Nokia Research Center, Family Story Play concept with Sesame Streer, Jan. 7, 2010, 4pages.*

* cited by examiner

*Primary Examiner* — Kesha Frisby
(74) *Attorney, Agent, or Firm* — Perkins Coie LLP

(57) ABSTRACT

An audiovisual recording of a user reading a book aloud is generated for playback with a virtual book. A book reading user interface presents a virtual book concurrently with a current image of the user. The virtual book may be presented based at least in part on an aspect ratio of the virtual book. As the user reads the virtual book aloud, an audiovisual recording of the user is generated. In addition, synchronization information is recorded that enables the audiovisual recording to be synchronized with the presentation of pages of the virtual book during playback. The generated audiovisual recording is stored in a database and may be played back to a recipient on demand.

28 Claims, 9 Drawing Sheets

| Page / Page Spread | Time |
|---|---|
| 1 | 0:00.00 |
| 2 | 0:10.23 |
| 3 | 0:22.41 |
| ... | ... |
| n | 4:03.02 |

FIG. 5

AUDIOVISUAL RECORD OF A USER READING A BOOK ALOUD FOR PLAYBACK WITH A VIRTUAL BOOK

CROSS-REFERENCE TO RELATED APPLICATION(S)

This application claims priority to and incorporates by reference in its entirety U.S. Provisional Patent Application No. 61/154,283, entitled SYSTEM FOR READING BOOKS ALOUD, filed on Feb. 20, 2009.

BACKGROUND

Reading books aloud is a traditional activity that people everywhere enjoy. However, it requires that a reader, a listener, and a book be together in the same physical place, which is not always possible. For example, a parent and child might have a regular nightly bedtime story, but the parent may be away on a business trip. Or a child may want to hear a book read by a grandparent who lives elsewhere and cannot participate on demand. Timing can also be a problem. For example, a child might want a story read to him on a long car trip when a parent is busy driving.

Current solutions to these and other problems include reading a book aloud to a listener over the phone or using a videoconferencing system. However, using a telecommunications system to convey a book reading does not begin to approach the experience of an in-person reading since the listener does not have access to a copy of the book being read. The lack of a book can be addressed by having the reader acquire another copy of the book and send it to the listener, or having the listener acquire his or her own copy of the book. Nevertheless, this solution does not allow a book to be read "on demand" if the listener is not presently in possession of the book.

Another current solution includes using an electronic presentation system (e.g., PowerPoint) to display a copy of the book along with an audio and/or video recording of the reader reading the book. To use such a system, however, the reader must scan the pages of the book for use in the presentation. Not only is this a significant inconvenience for the reader, it may violate the copyright protections of the book.

Yet another current solution involves the reader making a video of him- or herself reading a book. Using a video editing system, the reader can then make a composite that includes the video of the reader along with scanned images of the book pages. Again, not only does this require a significant effort by the reader, it may violate the copyright protections of the book.

Accordingly, it would be desirable to provide a system that offers a closer equivalent of the book reading experience, including providing representations of the reader's face and voice along with a high quality version of the book itself. In addition, the book reading experience should be available to readers and listeners in different physical locations, and the experience should be available on demand.

BRIEF DESCRIPTION OF THE DRAWINGS

FIG. 5 is a block diagram of a data structure for storing page synchronization information.

DETAILED DESCRIPTION

Figure 1:
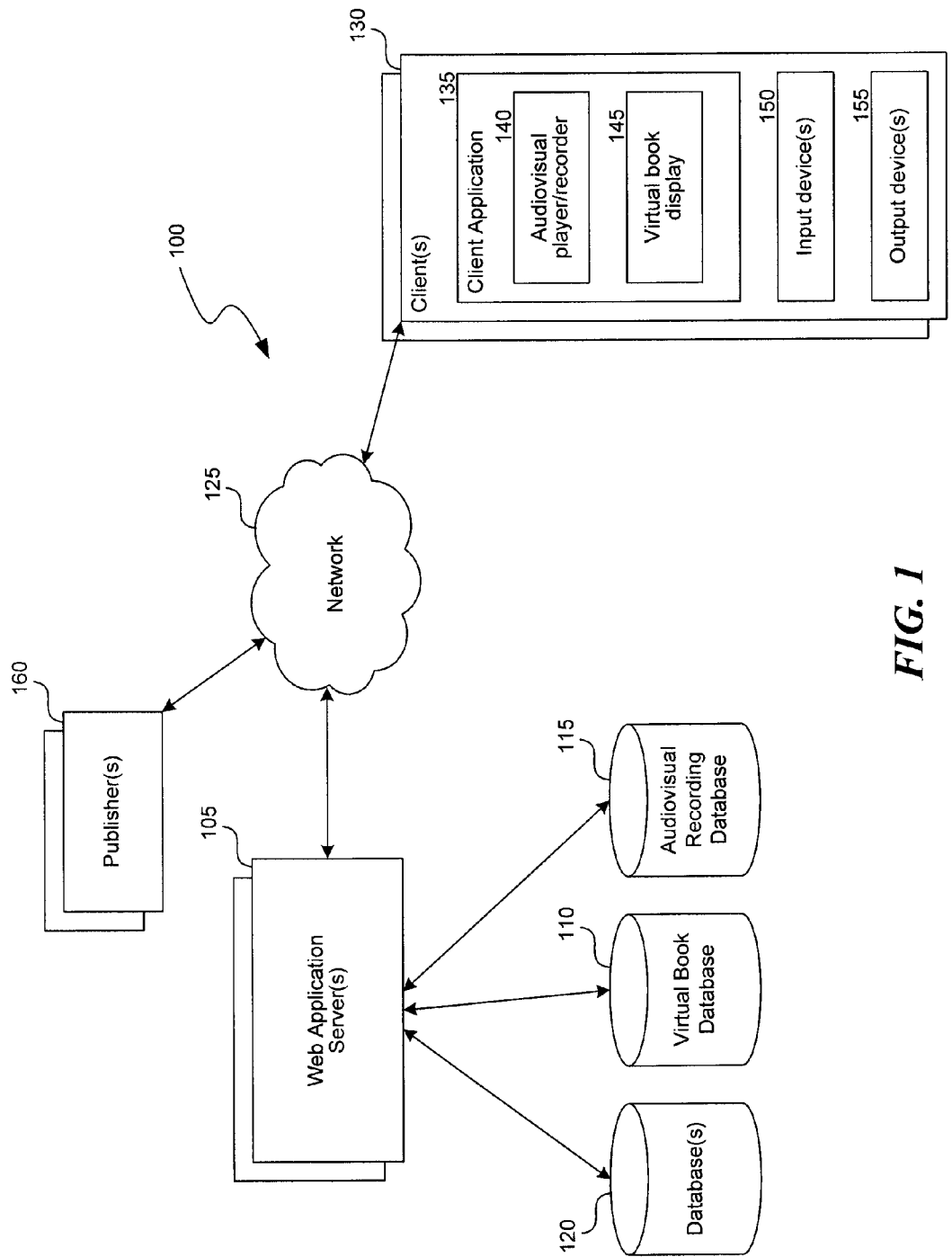
FIG. 1 is a block diagram of a representative system in which aspects of the described technology may operate.

A method and system for generating an audiovisual recording of a user reading a book aloud for playback with a virtual book is described herein. In some embodiments, a book reading user interface presents a virtual book along with a current image of the user. As the user reads the virtual book aloud, an audiovisual recording of the user is generated. In addition, the system records information that will allow the audiovisual recording to be synchronized with the presentation of pages of the virtual book during playback. The generated audiovisual recording is stored in a database and may be played back to a recipient on demand. During playback, the virtual book pages are turned in synchronization with the audiovisual recording based on the stored information. Among other benefits, the described technology offers a rich version of the book reading experience across physical distances and on demand.

A virtual book is an electronic version of a book that may or may not have a physical counterpart. Virtual books may comprise images, animations, videos, and/or other multimedia along with traditional text. A virtual book may be rendered as a three-dimensional representation of a physical book, for example, with front and back covers that are thicker than the pages of the book. In some embodiments, virtual books are books that lend themselves to being read aloud, such as books with a multimedia component combined with a relatively small amount of text, including children's books.

In some embodiments, virtual books are displayed differently by the book reading user interface based at least in part on the aspect ratio of the virtual book. For example, a book that is much wider than it is tall may be displayed one page at a time, while a tall, thin book may be displayed as a two-page spread. When a browser window containing the book reading user interface is resized, the system may modify the book view. For example, if the browser window is initially taller than it is wide, the system may first display a virtual book one page at a time. If the browser window is resized to be wider than it is tall, the system may modify the book view so that the virtual book is displayed as a two-page spread.

In some embodiments, the user may control the size of the virtual book and/or the video of the user reading the book aloud. For example, the recipient may modify the size of the video by dragging and dropping a corner of a video window containing the video. As the video window gets larger, the virtual book may get correspondingly smaller; as the video window gets smaller, the virtual book may get correspondingly larger.

In some embodiments, a user may select an object—such as an arrow, shape, or text box—to be incorporated into the presentation of the virtual book. For example, the user may select an arrow to point to a word or image on a page of the virtual book. When the virtual book is played back to the recipient, the object will appear on the page in the same location and at substantially the same time during the audiovisual recording.

During playback, the book reading user interface presents the virtual book along with the generated audiovisual recording of the user reading the book aloud. As the audiovisual recording plays, the recorded information allows the system to synchronize the recording with the presentation of pages of the virtual book. In some embodiments, the recipient may control the portion of the audiovisual recording that is presented, such as by selecting a particular page, word, or phrase in the virtual book. Alternatively or additionally, a moving marker—such as a "bouncing ball" or highlighting—may be displayed in association with the words of the virtual book, to facilitate reading along by the recipient.

Various embodiments of the technology will now be described. The following description provides specific details for a thorough understanding and an enabling description of these embodiments. One skilled in the art will understand, however, that the described technology may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the technology.

1. Suitable System for Virtual Book Recording and Playback

FIG. 1 depicts a representative system 100 in which aspects of the described technology may operate. The system 100 includes one or more web application servers 105. In some embodiments, the web application server(s) 105 are associated with a web site through which the system may be accessed by users and recipients.

The web application server(s) 105 are coupled to a virtual book database 110, an audiovisual recording database 115, and one or more other databases 120. The virtual book database 110 stores text, images, animations, videos, and/or other multimedia associated with a plurality of virtual books. For example, the virtual book database 110 may include images of book covers, pages, and endpapers associated with the virtual books. Alternatively or additionally, the virtual book database 110 may include videos, animations, and/or other multimedia associated with the virtual books. The virtual book database 110 may also include metadata and other information associated with the virtual books, such as titles, authors, summaries, prices, and/or other information.

The audiovisual recording database 115 stores a plurality of audiovisual recordings of users reading virtual books aloud, as described in additional detail herein. In some embodiments, the audiovisual recordings are stored as multimedia files having both audio and video components, while in other embodiments, the audiovisual recordings are stored as separate audio and video files. The audiovisual recording database 115 also includes page synchronization information that allows the audiovisual recordings to be synchronized with the presentation of pages of the virtual books during playback.

Additional database(s) 120 store user profile information, metadata, usage statistics, and/or other information associated with the system. Although the virtual book database 110, audiovisual recording database 115, and other database(s) 120 are depicted in FIG. 1 as separate databases, one skilled in the art will appreciate that a single database and/or other combinations of databases may store the information described herein. In addition, the web application server(s) 105 may implement a variety of standard web site features, including user accounts, payment acceptance, customer service information, and other features that, in the interest of brevity, will not be described in detail herein.

The web application server(s) 105 are connected to one or more book publishers 160 via a network 125, such as the Internet, a wide area network (WAN), a local area network (LAN), or other network. The publisher(s) 160 may upload images, animations, videos, and/or other multimedia associated with one or more virtual books. In addition, the publisher(s) may provide metadata and other information associated with the virtual books, such as titles, authors, summaries, prices, and/or other information.

The web application server(s) 105 are also connected to one or more clients 130 via the network 125. Although the same network 125 is depicted as connecting both the client(s) 130 and the publisher(s) 160 to the web application server(s) 105, one skilled in the art will appreciate that the client(s) and publisher(s) may be connected to the web application server(s) via different networks.

In some embodiments, the client(s) 130 comprise one or more computer systems. The term "computer," as used herein, may include general purpose computer systems, televisions, set-top boxes, microprocessor-based or programmable consumer electronics, Internet appliances, multi-processor systems, network PCs, mini-computers, and the like. The term "computer" may also refer to a special purpose computer or data processor that is specifically programmed, configured, or constructed to perform one or more computer-executable instructions.

Alternatively or additionally, the technology described herein may be operated on a mobile device, such as a cell phone, a smartphone, a personal digital assistant (PDA), a portable email device (e.g., a BlackBerry® device), a portable media player (e.g., an Apple iPod Touch®), a portable gaming device (e.g., a Gameboy®), a tablet or touch screen display device (e.g., an Apple iPad®), or any other device having the ability to capture and/or playback an audiovisual recording of a reader along with a presentation of a virtual book.

Each client 130 includes a client application 135 comprising an audiovisual player/recorder 140 and a virtual book display component 145. In addition, the client 130 includes one or more input devices 150—such as a camera, microphone, keyboard, mouse, and/or other input device—and one or more output devices 155—such as a display device, speakers, and/or other output device.

In some embodiments, the client application 135 is accessible via a web browser, and requires little or no software installation on the client 130. In other embodiments, the client application 135 is a standalone application, a dedicated hardware appliance, and/or another application. In those embodiments in which the client application 135 is accessible via a web browser, the web application server(s) 105 provide the client 130 with one or more web pages implementing the application. These web pages may comprise HTML, XML, or other web page documents. In addition, the web pages may include components that implement a variety of technologies, including Adobe® Flash® and other multimedia technologies.

The client application 135 includes an audiovisual player/recorder 140 configured to generate and playback an audiovisual recording of a user reading a virtual book aloud. During recording, the audiovisual player/recorder 140 receives audiovisual input from the user via the one or more input devices 150, such as a camera and a microphone. The audiovisual player/recorder 140 presents the received audiovisual information via the display device as feedback to the user during recording, and streams the audiovisual information to the web application server(s) 105 where it is stored as an audiovisual recording for playback to a recipient as a reading of the virtual book.

The client application 135 also includes a virtual book display component 145 configured to display via the display device a virtual book, while the audiovisual recording is being generated and/or played back. The display of a virtual book is described in additional detail herein.

One skilled in the art will appreciate that one or more variations on the web server architecture depicted in FIG. 1 may be implemented. For example, database servers may be replicated, the content delivery network may be varied, and/ or other changes may be made to the architecture. While aspects of the technology, such as certain functions, are described herein as being performed exclusively on a single device, the technology can also be practiced in distributed environments where functions or modules are shared among disparate processing devices. The disparate processing devices are linked through a communications network, such as a LAN, WAN, or the Internet. In a distributed computing environment, program modules may be located in both local and remote memory storage devices.

Although not required, aspects of the technology may be described herein in the general context of computer-executable instructions, such as routines executed by a general or special purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data related to the technology may be distributed over the Internet or over other networks (including wireless networks), on a propagated signal on a propagation medium (e.g., an electromagnetic wave(s), a sound wave, etc.) over a period of time. In some implementations, the data may be provided on any analog or digital network (packet switched, circuit switched, or other scheme).

2. Virtual Books

As previously described, the virtual book database 110 stores text, images, animations, videos, and/or other multimedia associated with a plurality of virtual books, in addition to metadata and other information associated with the virtual books. A virtual book is an electronic version of a book. In some embodiments, the virtual book has a physical counterpart, while in other embodiments the virtual book is originally created as an electronic book and may not have a physical counterpart. When the virtual book is originally created as an electronic book, however, a physical counterpart may subsequently be created and/or published. In some embodiments, a physical counterpart may include a coupon that allows the purchaser to generate an audiovisual recording for playback with a virtual copy of the book. The coupon may cover all or a portion of the purchase price of the virtual book.

A virtual book may comprise images, animations, videos, and/or other multimedia along with traditional text. Virtual books may be of a variety of different types of books, including, but not limited to, children's books, books of poetry, photo albums, interactive books, user-created books, flash cards, greeting cards having multimedia content, and/or other types of books. In some embodiments, virtual books are books that lend themselves to being read aloud, such as books with a multimedia component combined with a relatively small amount of text, including one or more of the previously described book types.

For each virtual book, the system stores in the virtual book database 110 images of a front cover, a back cover, and pages of the book. For a virtual book that has a book jacket, the system may also store images of a front flap and a back flap of the book jacket. In some embodiments, images of the virtual book are obtained by scanning the covers, pages, and/or other components of a physical book. In other embodiments, the virtual book images are obtained from electronic images. For example, the virtual book images may be rendered from design files used to produce a physical book. As another example, when a virtual book does not have a physical counterpart, virtual book images may be created in electronic form, such as by using an electronic drawing and/or multimedia program.

In some embodiments, the images of the virtual book provided by a book publisher 160. For example, a publisher 160 may upload images of the book in a standard format, such as .jpg or .png files. In addition, the publisher 160 may provide metadata or other information associated with the virtual book, such as title, author, summary, recommended ages, price, and/or other information. In the same way, publisher(s) 160 may also edit and/or delete virtual books, metadata, and/ or other information in the system. These capabilities may be provided to the publisher(s) 160 via a publisher user interface (not shown). Once a publisher 160 has provided images, metadata, and/or other information for a virtual book, the virtual book may appear in the system as an available virtual book. In some embodiments, however, a system administrator is required to administrator is required to approve the virtual book before it appears as available. Publishers 160 may receive payments when their virtual books are purchased or read, and/or according to another arrangement.

Once the images for a virtual book have been obtained, the system uses these images to render the virtual book. The client application 135 may render the virtual book at run time, and/or the virtual book may be pre-rendered by the system and displayed by the client application. The virtual book may be rendered at runtime using any of a wide variety of multimedia technologies, including, but not limited to Adobe® Flash®, JavaFX®, and/or Microsoft® Silverlight®. Alternatively or additionally, the virtual book may be pre-rendered by creating a video (e.g., MPEG) file of the virtual book.

In some embodiments, the virtual book is rendered in a manner that resembles a physical book. For example, the virtual book may be rendered as a three-dimensional representation of a physical book, with front and back covers displayed to have greater thickness than the pages of the book. As another example, when the virtual book is opened to the first page, there may appear to be a stack of pages on the right hand side of the book, while there do not appear to be any pages on the left hand side of the book. As the pages are turned, the stack of pages on the right hand side may appear to decrease, while a stack of pages on the left hand side of the book may appear to grow. Other features of a physical book may also be represented, such as the curvature of the book spine, the overall thickness of the book, and other features of the book.

In some embodiments, a virtual book is created to include one or more interactive components. For example, a virtual book may be configured to allow a user to turn the pages of the book by interacting with the book. By selecting a right hand side and/or corner of the virtual book—such as with a mouse, stylus, finger or other implement—the user may cause the next page to be displayed. By selecting a left hand side and/or corner of the virtual book, the user may cause the previous page to be displayed. In addition, the virtual book may be animated to turn a page in a manner that resembles an actual page turning.

The virtual book may also include interactive characters, images, and/or other features. For example, when a user selects an image of a dog on a page of the virtual book, a sound (e.g., a "bark"), an animation (e.g., the dog running across the page), and/or another multimedia effect may be presented. Other interactive features will be described in additional detail herein.

In some embodiments, the virtual book includes a customizable dedication page. A dedication page comprises one or more pages, generally at or near the beginning of the virtual book, that may be customized by the user. The user may customize the dedication page with text, images, and/or other multimedia that are provided by the system and/or uploaded by the user. For example, the user may customize the dedication page by typing a message or inscription (e.g., "This book belongs to Timmy"), uploading a photo of the user and/or recipient, and/or personalizing the virtual book in another manner.

In some embodiments, the virtual book may be rendered in a manner that incorporates other techniques. For example, a pop-up or traditional book may be created to resemble a three-dimensional film. One skilled in the art will appreciate that a variety of other multimedia techniques may be implemented.

The web application server(s) 105 serve the virtual book to the client application 135 for display by a suitable virtual book display component 145. For example, in embodiments in which the virtual book is to be rendered at run time, the virtual book display component 145 may be configured to run Adobe® Flash®. In embodiments in which the virtual book is pre-rendered, such as by creating a video (e.g., MPEG) file, the virtual book display component 145 may simply be configured to play video files.

In some embodiments, one or more security measures are implemented to make it more difficult to extract virtual book images and other content for unauthorized use. These security measures include, but are not limited to, obscuring the URLs used to serve virtual book images and other content, using time-limited URLs, encrypting images and other content, and using digital rights management (DRM) features provided by a client's 130 operating system or at application runtime.

In some embodiments, the web application server(s) 105 store information about virtual books that are purchased and/or played back, including the number of times a virtual book is previewed, the number of times the virtual book is purchased and/or played back, and/or other information regarding purchase and/or playback of the virtual book. The stored information about virtual books may be provided to the publisher(s) 160 periodically and/or on demand. In addition, the publisher(s) 160 may be provided with information about how their virtual books compare to other books in the system, such as a ranking of the popularity of their virtual books.

3. Generating an Audiovisual Recording

Figure 2:
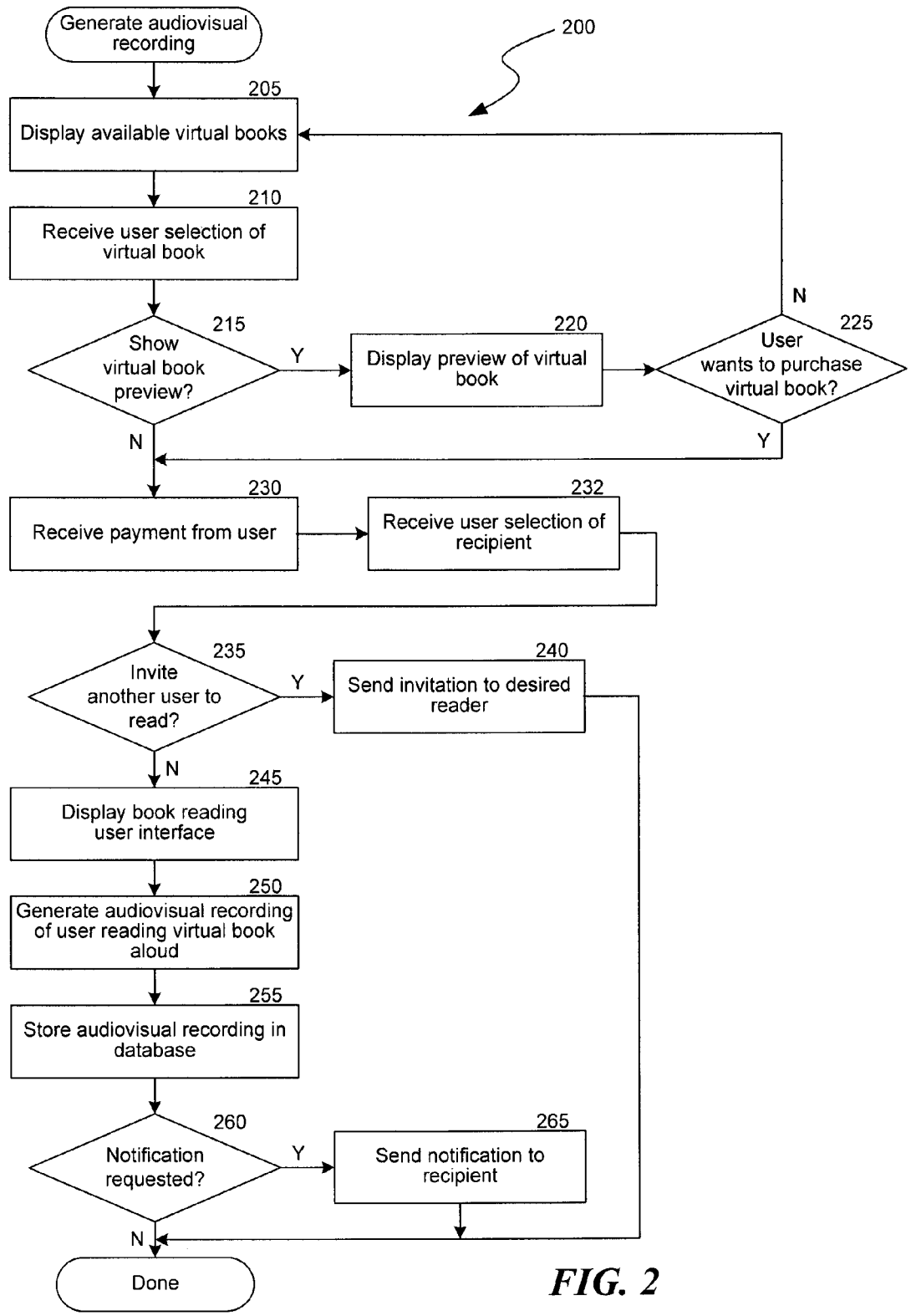
FIG. 2 is a flow diagram of a process for generating an audiovisual recording.

FIG. 2 is a flow diagram of a process 200 for generating an audiovisual recording in accordance with embodiments of the described technology. An audiovisual recording is a record of a user reading a virtual book aloud, generally comprising both audio and video components. In some embodiments, however, the term "aloud" refers to a reading of the book that may not have an audio component. For example, a user may "read" a virtual book using American Sign Language (ASL), with or without also speaking the words aloud.

The user may initiate the audiovisual recording process 200 by selecting a "Read Book," "Select Book," or other link on a web site associated with the web application server(s) 105 (FIG. 1). In some embodiments, the user is required to log into the web site before an audiovisual recording may be generated.

Figure 3:
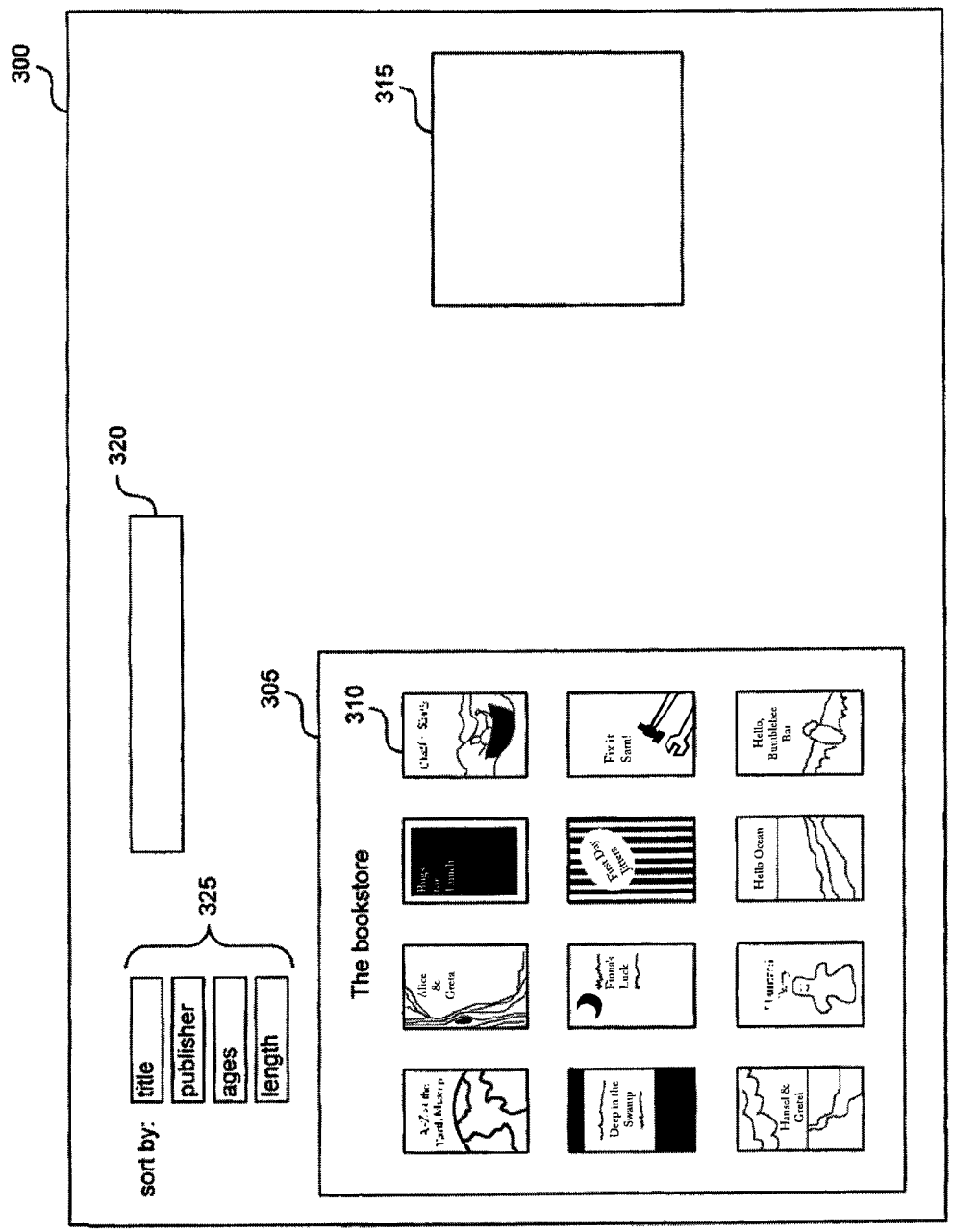
FIG. 3 is a display diagram of a user interface for displaying available virtual books to a user.

Once the user initiates the process 200, at a block 205, the system displays available virtual books to the user. FIG. 3 is a display diagram of a suitable user interface 300 for displaying available virtual books 310 to a user. The user interface 300 includes a bookshelf area 305 displaying a plurality of virtual books 310. Each of the virtual books 310 may be represented by an image, animation, and/or video of the book cover; a textual and/or graphical representation of the book title; and/or in a variety of other ways.

The virtual books 310 may be organized in the bookshelf area 305 according to a variety of techniques. For example, the virtual books 310 may be organized and presented from newest to oldest publication date; alphabetically by title or publisher; according to book genre or category; in chronological order of recommended age; in order of book length; in order of popularity among all users; in order of projected interest for a particular user; in a random or pseudorandom order; and/or in a combination of these and other ways.

The virtual books 310 are initially presented to the user according to a default organization. The default organization may be selected by a web site administrator and/or the user (e.g., as part of a web site profile). The user can select one of a plurality of controls 325 in order to sort the virtual books 310 according to another organization. For example, the controls 325 may allow the user to sort the virtual books 310 according to title, publisher, ages, length, and/or other feature. In addition, the user can type one or more alphanumeric characters into a search box 320 in order to find one or more virtual books with a particular title, publisher, category, age, length, and/or other feature.

In some embodiments, when a user indicates an interest in a virtual book 310, such as by hovering a cursor over the virtual book or selecting the book using the input device 150, the user interface 300 displays additional information about the virtual book. For example, the user interface 300 may display a pop-up window, balloon, and/or other feature that displays a summary of the virtual book 310 of interest. The summary may include a variety of information, including title, author, publisher, a synopsis of the story line, length, recommended age, price, and/or other information about the virtual book 310.

The user interface 300 may also include a message area 315 that includes instructions on how to select and/or generate an audiovisual recording for a virtual book 310, a link to a video demonstration of how to select and/or generate an audiovisual recording for a virtual book, a link to a frequently asked questions web page, and/or a variety of other information.

Returning to FIG. 2, at a block 210 the system receives a user selection of an available virtual book 310. The user can select a virtual book 310 in any of a variety of well known ways, such as by using a mouse, stylus, finger, or other implement to select the virtual book.

At a decision block 215, the system determines whether a preview of the selected virtual book 310 is to be displayed. In some embodiments, the system always displays a virtual book preview, while in other embodiments, the system may present the user with a preview option (e.g., "click here to see a preview of the book"). If a virtual book preview is to be displayed, at a block 220 the system displays the preview of the selected virtual book 310 via the display device. A virtual book preview comprises display of one or more pages of the selected virtual book 310. Among other benefits, the virtual book preview allows a user to view at least a portion of a virtual book 310 before deciding whether to purchase the virtual book and make a recording. Display of virtual books is described in additional detail herein.

A variety of protections may apply to a virtual book preview, including only displaying a limited number of pages of the virtual book, displaying a "PREVIEW" mark across each page of the preview, and/or a combination of these and other safeguards. For example, in some embodiments, the virtual book preview is limited to a certain number of pages of the virtual book 310, such that the user is not permitted to read the entire book. The protections for the virtual book preview may be defined by a system administrator, a publisher, and/or in another manner.

At a decision block 225, the system determines whether the user wants to purchase the previewed virtual book 310. For example, the user may indicate a desire to purchase the previewed book by clicking on a "record this book" link that is presented along with the virtual book preview. The link may be displayed throughout the virtual book preview, or the link may be displayed to the user after the preview is complete (e.g., after the last page of the preview has been displayed). If the user does not wish to purchase the book, the process returns to block 205, where the available virtual books 310 are displayed to the user. The user can select another virtual book 310 to preview and/or record.

If at block 225 the user wishes to purchase the previewed virtual book 310, or if at decision block 215 a virtual book preview is not to be shown, at a block 230, the system receives payment from the user. The payment may be received using any of a variety of well known web payment systems. In some embodiments, the system does not require payment until the user has recorded and is satisfied with an audiovisual recording, while in other embodiments, the system receives payment information from the user at block 230, but delays processing of the payment until the user has recorded and is satisfied with an audiovisual recording. In some embodiments, instead of receiving a payment from a user for each virtual book, the user may have a subscription (e.g., a monthly subscription) that entitles the user to access and record a certain number of virtual books 310 (including an unlimited number) during the subscription period.

At a block 232, the system receives a user selection of one or more recipients to receive the virtual book reading. For example, the user may provide the system with information about a recipient, such as the recipient's name, email address, web site profile ID, and/or other information. Alternatively or additionally, the user may select a recipient from a list of saved recipients. For example, a user may have previously sent a virtual book reading to his grandson, Max. Max's name may now appear in a list of recipients from which the user can select.

At a block 235, the system determines whether the user wishes to invite another person to read the selected virtual book 310. The user may indicate such a desire by clicking on an "invite another person to read" link that is presented along with the selected virtual book 310. For example, the desired reader (e.g., a grandparent) may not be as computer-savvy as the user setting up the reading. The system facilitates an easier reading process for the desired reader by letting another person set up the reading, and then sending an invitation to the desired reader. In some embodiments, the invitation includes a link that takes the desired reader directly to a book reading web page, without having to go through the process of setting up the reading.

If the user wishes to invite another person to read the selected virtual book 310, at a block 240 the system sends a reading invitation to the desired reader. The invitation may be sent via email, a message to the desired reader's web site profile, and/or in another manner. The user provides the system with information about the desired reader, such as the desired reader's name, email address, web site profile identifier (ID), and/or other information. The user may also include a message to the desired reader to be included in the reading invitation. The reading invitation includes information about the invitation, any message from the user, and a link to the web page where the desired reader can generate an audiovisual recording for the selected virtual book 310.

Figure 4:
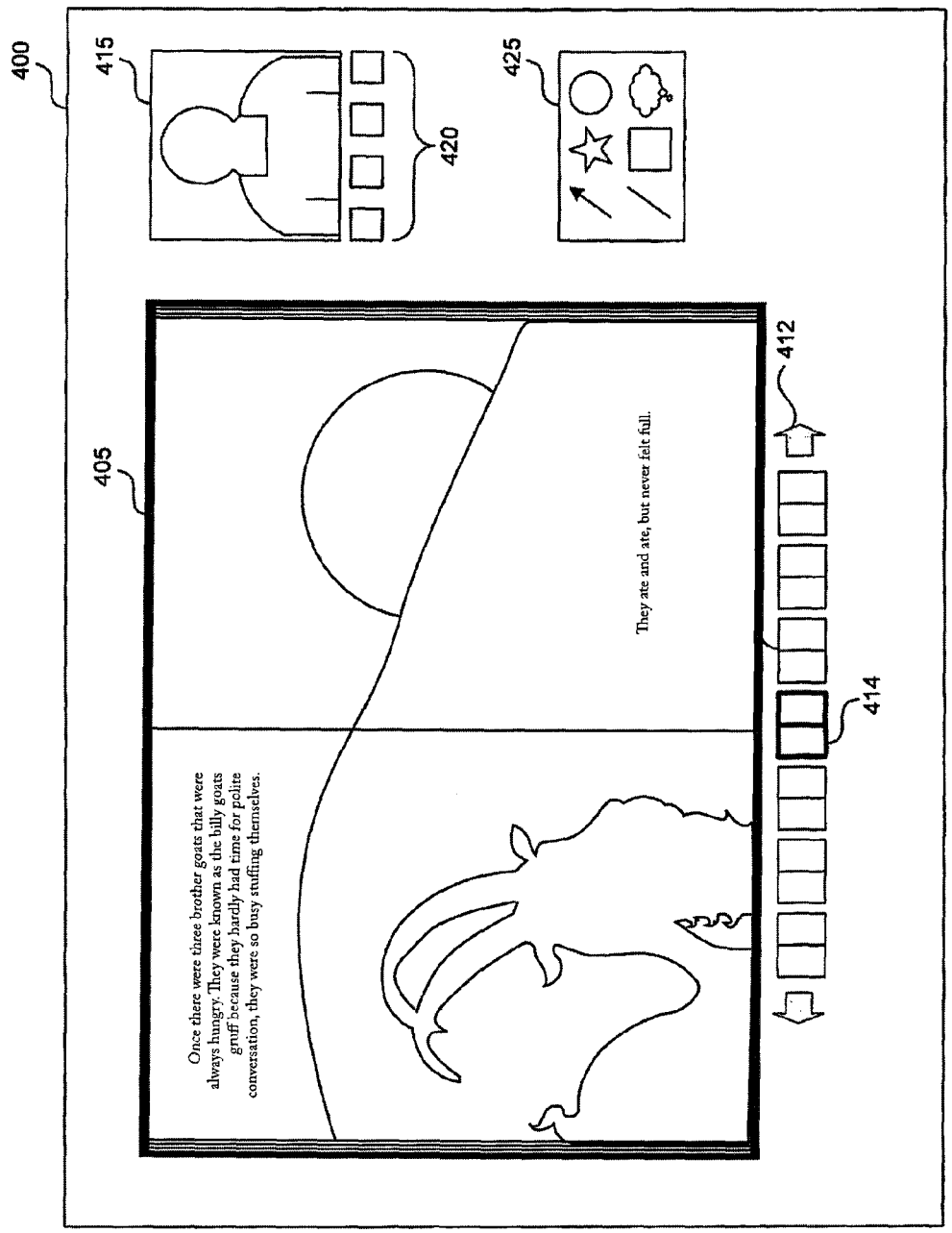
FIG. 4 is a display diagram of a book reading user interface.

If, however, the user him- or herself desires to read the virtual book 310, at a block 245 the system displays a book reading user interface to the user. FIG. 4 is a display diagram of a suitable book reading user interface 400. In some embodiments, the book reading user interface 400 is used both to generate and playback an audiovisual recording along with the presentation of a virtual book 310. When used for both recording and playback, the user interface 400 may be similar in layout but may offer different controls to a user in order to provide a user interface that is more suitable for each implementation.

The book reading user interface 400 includes a virtual book viewer 405 that displays the pages of the selected virtual book 310. Virtual books 310 may be displayed differently by the book viewer 405, based at least in part on the aspect ratio of the virtual book. For example, a book that is much wider than it is tall may be displayed one page at a time, while a tall, thin book may be displayed as a two-page spread, such as that depicted by FIG. 4. When a book is displayed one page at a time, the book viewer 405 may display an entire page and a portion (e.g., 10% or 25%) of the adjacent page, so that the user and/or recipient can visualize how adjacent pages fit together.

The way a virtual book 310 is to be displayed by the book viewer 405 (herein referred to as the "book view") may be defined by a system administrator, a publisher, a user or recipient, and/or in another manner. For example, a system administrator may define a book view for each virtual book stored in the virtual book database 110. The book view may be informed by a book publisher's requirements. For example, a publisher may always want its virtual books 310 displayed as two-page spreads. The defined book view may be stored in the virtual book database 110 in association with the virtual book 310. For example, the system may store an identifier or flag that signals to the client application 135 how the virtual book is to be displayed by the book viewer 405.

The user and/or recipient may also specify the book view. For example, the user and/or recipient may select a web site profile option, such as "display books according to their default views," "always display books one page at a time," "always display books two pages at a time," and/or another option.

In some embodiments, the system modifies the book view when the user and/or recipient resizes a browser window containing the client application 135. For example, if the browser window is initially taller than it is wide, the system may first display the virtual book 310 one page at a time. If the browser window is resized to be wider than it is tall, the system may modify the book view so that the virtual book 310 is displayed as a two-page spread.

In some embodiments, the book reading user interface 400 includes a navigation area 410 that displays all or a portion of the pages (or page spreads) of the virtual book 310. If the virtual book 310 includes more than a maximum number of pages displayable in the navigation area 410, the navigation area may display arrows 412 or other controls that allow the user to see pages that are not currently displayed in the navigation area. The reader may navigate from page to page (or page spread to page spread) within the virtual book 310 by selecting a page (or page spread) from the navigation area 410. The current page (or page spreads) displayed to the user by the book viewer 405 may be highlighted 414 or otherwise distinguished from the other pages (or page spreads) in the navigation area 410. In other embodiments, the navigation area 410 may be omitted to provide a simpler user interface 400 to the recipient.

The book reading user interface 400 also includes a video display window 415 and a control area 420 having a plurality of recording/playback controls. During recording, the video display window 415 presents a current image of the user as feedback to the user. Accordingly, the user may use the video display window 415 to check positioning, lighting, etc. During recording, the recording/playback controls 420 allow the user to start, stop, pause, and/or otherwise manipulate the audiovisual recording, in addition to allowing the user to re-record one or more portions of the recording. When reviewing a portion of the recording, the video display window 415 shifts to a playback mode to allow the user to review all or a portion of any recording that is made. During playback, the video display window 415 presents the audiovisual recording of the user reading the story to the recipient. During playback, the recording/playback controls 420 allow the recipient to start, stop, pause, and/or otherwise manipulate the audiovisual recording.

The size of the video display window 415 may vary based on whether the user interface 400 is that of the recording or playback implementation. For example, the video display window 415 may be smaller in the recording implementation, as the audiovisual recording is primarily used for feedback to the user. The video display window 415 may be larger in the playback implementation, to provide the recipient with a clear view of the user as he or she reads the virtual book 310 aloud. Alternatively or additionally, during the recording implementation, the video display window 415 may present a mirror image of the audiovisual recording that the recipient will see during playback. A mirror image means that during recording, the video display window 415 flips the image of the user so that movement of the user in real life is mirrored by the image of the user in the video display window (e.g. movement of the user to the left is displayed as movement of the user towards the left side of the display as viewed by the user). In contrast, when in playback mode, the motion of the user in the video display window 415 will accurately show the movement of the user (e.g., movement of the user to the left during recording is displayed as movement of the user towards the right side of the display when viewed by the recipient).

In some embodiments, the user and/or recipient may control the size of the video display window 415 and/or the book viewer 405. For example, the video display window 415 and the book viewer 405 may initially be displayed at a default size. The default sizes may be specified by a system administrator, a user or recipient (e.g., via a web site profile option), and/or in another manner. The user or recipient may modify the size of the video display window 415, such as by dragging and dropping a corner of the window, selecting an "expand window" and/or "shrink window" control (not shown), and/or in another manner. As the video display window 415 gets larger, the book viewer 405 may get correspondingly smaller. Similarly, as the video display window 415 gets smaller, the book viewer 405 may get correspondingly larger. The user and/or recipient may control the size of the book viewer 405 in the same way. In some embodiments, the video display window 415 may overlap with the book viewer 405 by a portion that does not significantly obscure either the book viewer or the video display window.

Returning to FIG. 2, at a block 250, the system generates an audiovisual recording of the user reading the selected virtual book 310 aloud. The first time a user makes a recording and/or uses a particular client 130 to make a recording, the system configures the input device(s) 150 of the user's client to work with the client application 135. For example, the system may configure a camera and a microphone of the client 130 (e.g., a camera and a microphone that are embedded in a user's computer to allow for teleconferencing) to work with the client application 135. The user may be required to allow the web application server(s) 105 and/or client application 135 to access the camera and the microphone. In addition, the system may conduct a series of tests, requesting feedback from the user as to whether the camera and/or microphone are working properly.

Once the input device(s) 150 of the client 130 have been configured to work with the client application 135, the system generates an audiovisual recording of the user reading the selected virtual book 310 aloud. To begin recording, the user selects a record control (not shown) from the control area 420, or otherwise indicates a desire to begin recording. During recording, the camera captures video of the user, while the microphone captures audio of the user.

In some embodiments, the user need not have a network connection in order to generate an audiovisual recording of the user reading a virtual book aloud. In such embodiments, the user may generate the audiovisual recording locally on the user's client 130, editing and/or rerecording as necessary. Once the user is satisfied with the audiovisual recording, the user can connect to the network 125 and upload the recording.

When recording begins, the cover of the virtual book 310 may be displayed by the virtual book viewer 405. The user may announce the title of the book, in addition to saying a personal message to the intended recipient. As the user finishes reading the page(s) (or cover) displayed by the virtual book viewer 405, the user selects the next page(s) to be displayed. The user may select the next page(s) by selecting the appropriate pages from the navigation area 410, by selecting a "next" arrow 412 displayed by the user interface 400, or in another manner. To facilitate selection of the appropriate pages, as previously described, the navigation area 410 may include an indication 414 of the currently selected pages, such as by highlighting or otherwise emphasizing the currently selected pages.

As a page in the virtual book 310 is turned, the virtual book viewer 405 may display an animation of the page being turned. In addition, in those embodiments in which a virtual book 310 is displayed one page at a time, the virtual book viewer 405 may also display an animation of the virtual book "sliding" from one side to the other. For example, where only a right hand page of a virtual book 310 is presently displayed and the user turns to the next page, the virtual book viewer 405 may display both the right hand page turning and the virtual book sliding back to the left hand side for display of the next page.

While the audiovisual recording is being generated, the system tracks information that will allow it to synchronize the audiovisual recording with the presentation of pages of the virtual book 310 during playback. For example, each time a user selects a next page (or pages) for display, the system records an indication of a current time in the audiovisual recording. FIG. 5 is a block diagram of a suitable data structure 500 for storing the page synchronization information. The data structure includes a page/page spread column 505 for storing an indication of each of the pages or page spreads, 1 through n, in the virtual book 310. The data structure also includes a time column 510 for storing an indication of a corresponding time in the audiovisual recording. A plurality of records 515 are generated during the audiovisual recording, one for each page or page spread in the virtual book 310. For example, record 520 indicates that when the audiovisual recording reaches time 0:10.23, the virtual book 310 should be turned to page (or page spread) 2, or vice versa.

In some embodiments, while the audiovisual recording is being generated, the system may also store information that allows it to generate a moving marker, such as a "bouncing ball," highlighting, and/or underlining, that is displayed in association with the words of the virtual book 310 during playback of the audiovisual recording. For example, the system may include a speech recognition component (not shown) that processes the user's voice to identify words and/or phrases spoken by the user, compares the identified words and/or phrases with the words and phrases in the virtual book, and stores an indication of a corresponding time in the audiovisual recording when the user speaks each word and/or phrase in the virtual book. In such embodiments, a data structure similar to the page synchronization data structure 500 (FIG. 5) may be used to store marker synchronization information. Such a data structure may include a marker position column indicating the word and/or phrase in the virtual book and a time column indicating the corresponding time in the audiovisual recording. A plurality of records may be generated during the audiovisual recording, such as one record for each word or phrase in the virtual book 310. During playback, the system uses the stored data structure to generate the marker and synchronize the marker's movement along the displayed virtual book text to match the user's actual reading speed. Among other benefits, a moving marker facilitates reading along by the recipient during playback.

In some embodiments, the book reading user interface 400 includes an interactive object area 425. The interactive object area 425 includes a variety of objects, such as lines, arrows, shapes, animations, text boxes, and/or other objects that a user may incorporate into the presentation of the virtual book 310. The user may select an object for incorporation in a variety of ways, including dragging the object from the interactive object area 425 and dropping the object at the desired location on a page displayed in the book viewer 405. The user may select one or more objects during and/or after generation of the audiovisual recording. For example, as the user is reading a particular page, the user may select an arrow to point to a word, image, character, or other feature on that page. When the virtual book 310 is played back to the recipient, the object will appear on the page in the same location and at substantially the same time during the audiovisual recording.

Alternatively or additionally, the user may select one or more objects for incorporation after the audiovisual recording has been generated. For example, taking the time to incorporate the objects during the audiovisual recording may distract the user from reading the book at an even, natural pace. Accordingly, once the audiovisual recording has been generated, the user may playback the recording and incorporate objects during playback. As the user incorporates objects, the user may pause playback of the audiovisual recording at the desired time of incorporation. For example, the user may wish to incorporate a more complex object, such as a text box or a thought bubble including text. The user may pause playback of the audiovisual recording, incorporate and complete the object, and resume playback. When the virtual book 310 is played back to the recipient, the complete object will appear on the page in the same location and at substantially the same time during the audiovisual recording. Alternatively or additionally, the user may let playback of the audiovisual recording continue to run as a more complex object is incorporated into the reading. When the virtual book 310 is played back to the recipient, the object may appear on the page in a progressive manner, as the user incorporated it. For example, a thought bubble may appear on a page of the virtual book 310, followed one-by-one with each letter the user typed into the thought bubble.

In those embodiments in which interactive objects are incorporated into a virtual book 310, a data structure similar to the page synchronization data structure 500 (FIG. 5) may be used to store object synchronization information. Such a data structure may include an object position column indicating the location of the object on the page and a time column indicating the corresponding time in the audiovisual recording. A plurality of records may be generated during the audiovisual recording (or during playback of the audiovisual recording), such as one record for each object incorporated by the user.

In some embodiments, the system may allow a user to incorporate him- or herself into the presentation of the virtual book 310. For example, the system may use a "green screen" technique to incorporate the user into the virtual book 310. That is, the system may first capture via the camera the background where the user will be reading the virtual book 310. Once the user is in place in front of the camera, the system may subtract the background area, generating an image of the user without the background. This image may be presented on a portion of the virtual book 310, allowing the user to point to a word, image, character, and/or other feature on a page of the virtual book.

Once the audiovisual recording has been generated, the user may playback and review all or a portion of the audiovisual recording, in addition to re-recording all or a portion of the recording. When the user is satisfied with the generated audiovisual recording, the user may select a "save" button or other control (not shown) in order to indicate that the recording is complete and to save a copy of the recording.

Returning to FIG. 2, at a block 255 the system stores the completed recording in the audiovisual recording database 115 (FIG. 1). In some embodiments, the audiovisual recording is stored as a single multimedia file, such as an MPEG file, while in other embodiments the audiovisual recording may be stored as separate audio and video files. The audiovisual recording is stored with any associated data tables, such as data structure 500 that stores page synchronization information or a data structure storing marker or object timing information. The audiovisual recording is stored along with an indication of the corresponding virtual book 310, so that the appropriate virtual book can be retrieved for playback. For example, the generated audiovisual recording may be stored along with an identifier of or pointer to the corresponding virtual book 310.

Once the audiovisual recording has been stored for playback, at a decision block 260, the system determines whether a notification is to be sent to the recipient. The user may request such a notification as part of the user's web site profile, such as by selecting an "always send a notification to recipient" or other profile option. Similarly, the recipient may request a notification as part of the recipient's web site profile, such as by selecting an "always send me a notification when a book is available" or other profile option. Alternatively or additionally, once the audiovisual recording is complete, the system may present the user with an option to send a notification to the recipient.

If a notification is requested, at a block 265, the system sends a notification to the recipient. The notification may be sent via email, a message to the recipient's own web site profile, and/or in another manner. The user provides the system with information about the recipient, such as the recipient's name, email address, web site profile ID, and/or other information. In addition, the user may provide a message to the recipient to be included in the notification. The notification includes information about the available virtual book reading, any message from the user, a link to a web page where the user can access the virtual book reading, and/or other information. Once the notification is sent (if requested), the process 200 completes.

Figure 6:
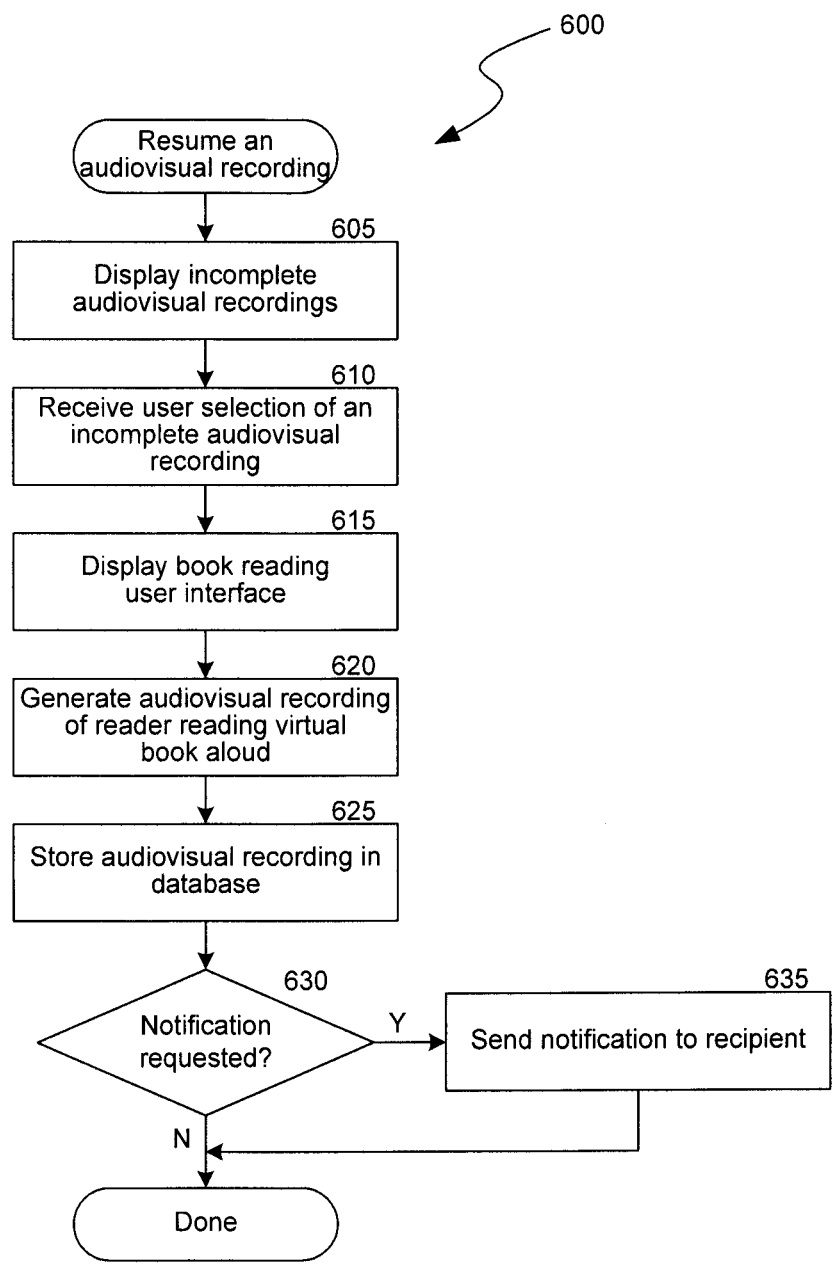
FIG. 6 is a flow diagram of a process for resuming an audiovisual recording.

A user may not always be able to complete an audiovisual recording in one sitting. Accordingly, the system may permit a user to save an incomplete audiovisual recording and resume it at a later time. FIG. 6 is a flow diagram of a process 600 for resuming an audiovisual recording in accordance with embodiments of the described technology. The user initiates the process 600, such as by selecting a "My Books" or other link on a web page associated with the user's profile. In response, at a block 605, the system displays the user's saved, incomplete audiovisual recordings. At a block 610, the system receives a user selection of an incomplete audiovisual recording. The process continues at blocks 615 through 635, which correspond to blocks 245 through 265 of FIG. 2, as previously described. When the book reading user interface 400 (FIG. 4) is displayed at block 615, the book viewer 405 displays the page (or page spread) of the virtual book 310 at which the user previously stopped recording. In some embodiments, the system may impose a time limit for completing an incomplete audiovisual recording. For example, a user may be given a day, a week, or a month to complete an audiovisual recording before it is deleted from the system.

Figure 7:
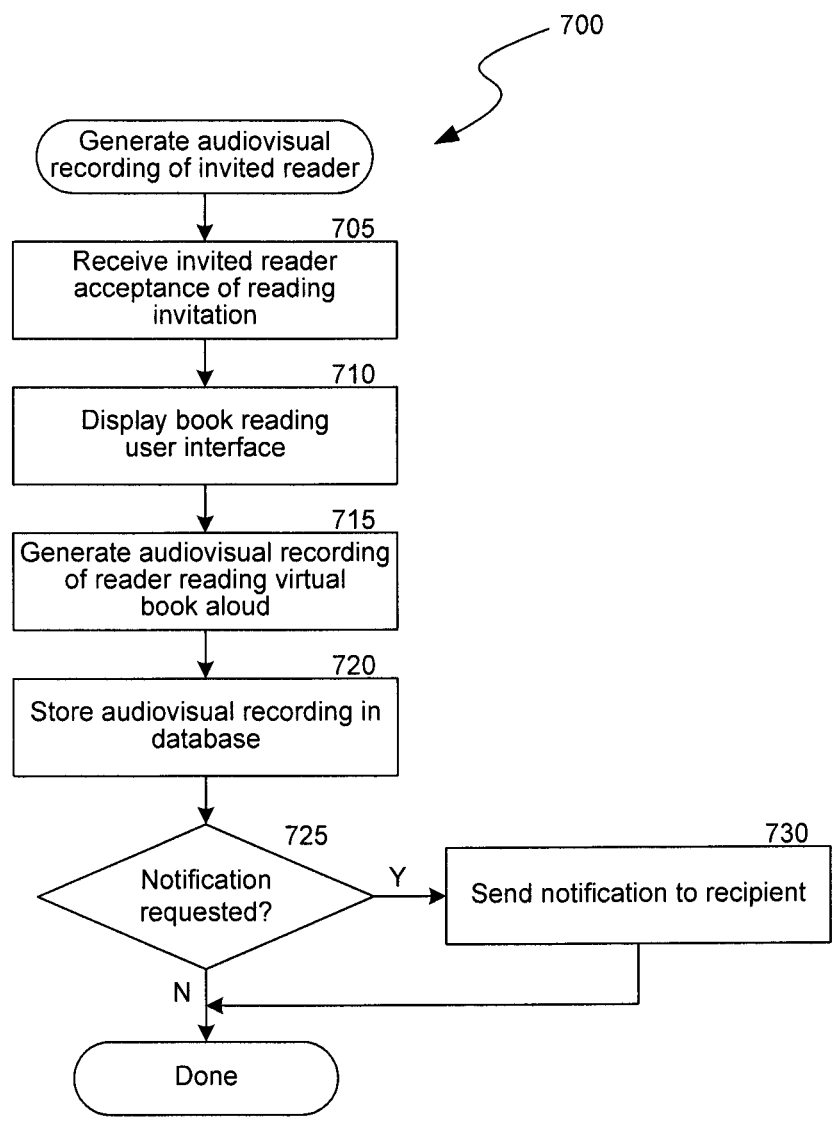
FIG. 7 is a flow diagram of a process for generating an audiovisual recording for an invited reader.

As previously described in reference to FIG. 2, a desired reader may receive an invitation to read a virtual book 310. FIG. 7 is a flow diagram of a suitable process 700 for generating an audiovisual recording for an invited reader. The process 700 is initiated when an invited user accepts the invitation to read the virtual book 310, such as by selecting a link to a web page where an audiovisual recording of the reading can be generated. Alternatively, the invited reader may select a book from a "My Books" or other link on a web page associated with the invited reader's profile. In some embodiments, the invited reader is required to log into the web site before an audiovisual recording may be generated.

At a block 705, the system receives the invited reader's acceptance of the reading invitation. In response, at a block 710 the system displays the book reading user interface 400 of FIG. 4 to the invited reader. As previously described, the reading invitation may take the reader directly to the book reading web page, to facilitate a straightforward reading process for the invited reader.

The process continues at blocks 715 through 730, which correspond to blocks 250 through 265 of FIG. 2, as previously described. The notification to the recipient at a decision block 725 operates in a manner similar to the notification described in reference to decision block 260. That is, the request may be made by the recipient and/or the user that invited the reader. The request may be made as part of the recipient or the user's profile, and/or as an option presented to the user after indicating a desire to invite another user to read. If the invited reader cannot complete the audiovisual recording in one sitting, the invited reader may resume the audiovisual recording as described in reference to FIG. 6.

4. Playback of a Virtual Book and Corresponding Audiovisual Recording

Figure 8:
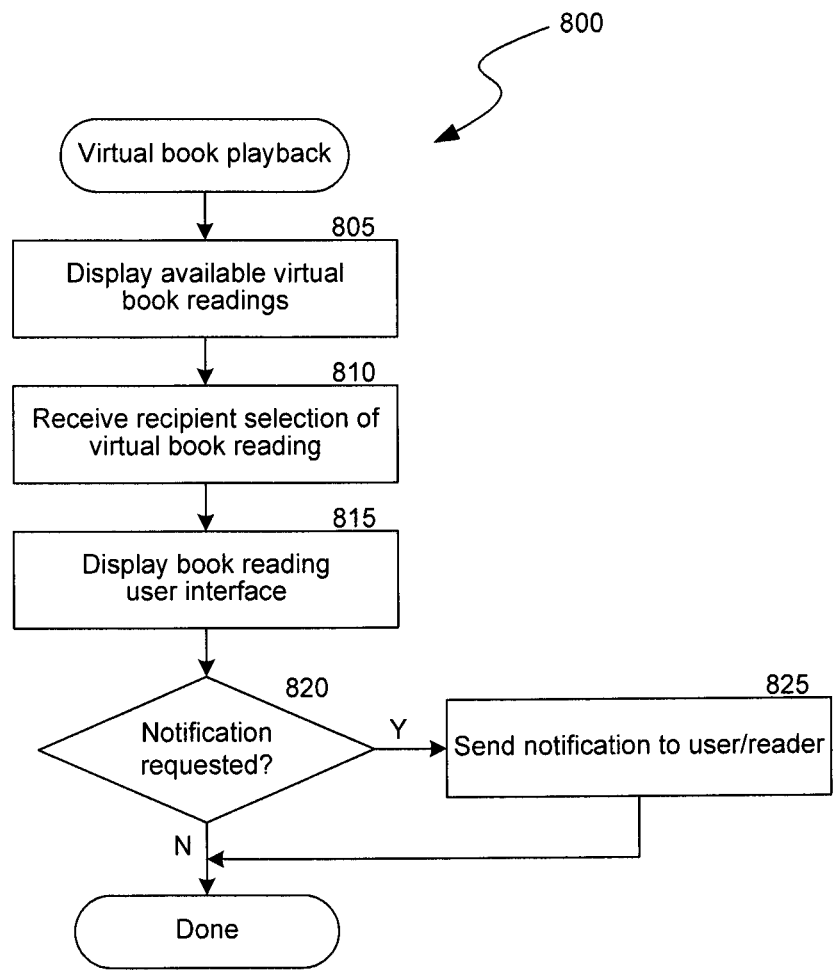
FIG. 8 is a flow diagram of a process for playing back an audiovisual recording along with a presentation of a virtual book.

FIG. 8 is a flow diagram of a process 800 for playing back an audiovisual recording along with a presentation of a virtual book 310 (herein referred to as a "virtual book reading") in accordance with embodiments of the described technology. A recipient initiates the process 800, such as by selecting a "My Books" or other link on a web page associated with the recipient's profile. In some embodiments, the recipient is required to log into the web site before accessing a virtual book reading.

Figure 9:
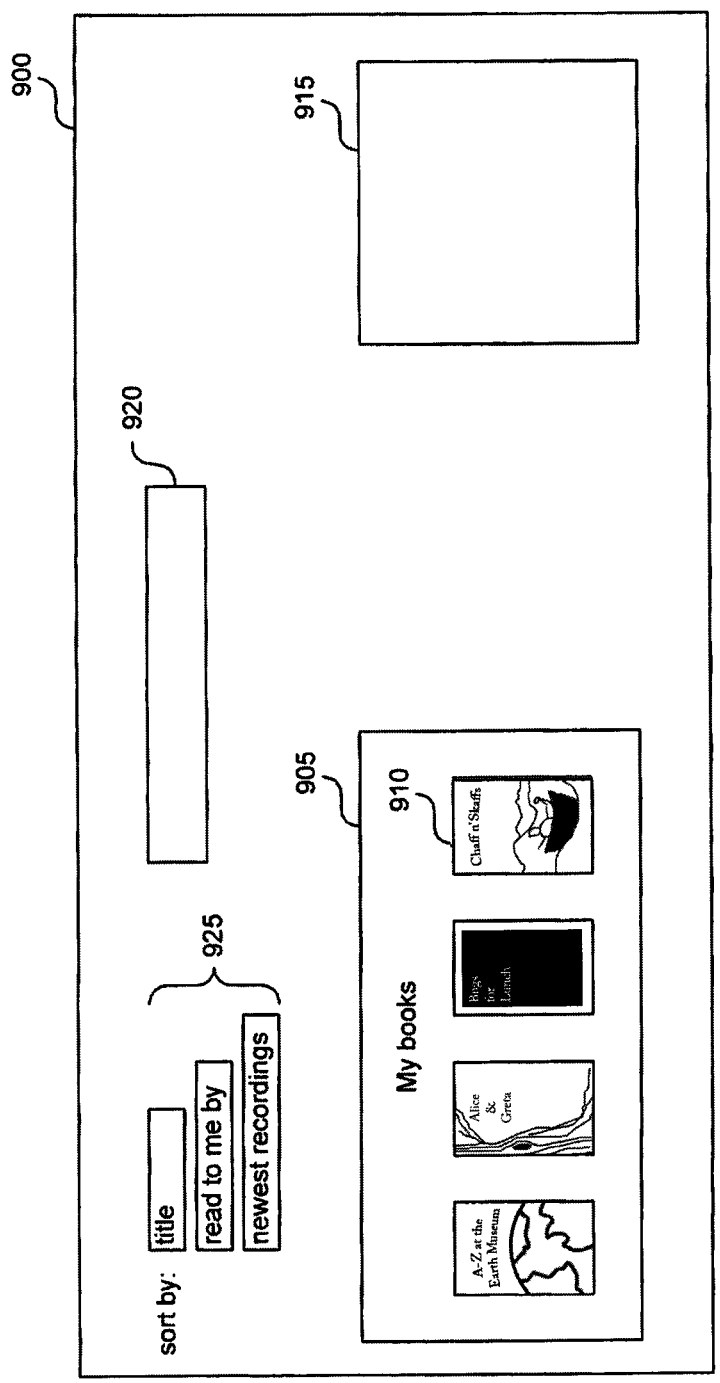
FIG. 9 is a display diagram of a user interface for displaying available virtual book readings to a recipient.

Once the recipient has initiated the process 800, at a block 805 the system displays virtual book readings that are available to the recipient. FIG. 9 is a display diagram of a suitable user interface 900 for displaying available virtual book readings 910 to a recipient. The user interface 900 includes a personal bookshelf area 905 displaying one or more virtual book readings 910 that have been recorded for the recipient. Each of the virtual book readings 910 may be represented by an image, animation, and/or video of the cover of the associated virtual book 310; a textual and/or graphical representation of the title of the associated virtual book; and/or in a variety of other ways.

The virtual book readings 910 may be organized in the personal bookshelf area 905 according to a variety of techniques. For example, the virtual book readings 910 may be organized and presented alphabetically by title of the associated virtual book 310; based on the user (or invited reader) who recorded the virtual book reading; from newest to oldest recording date; in order of frequency of play by the recipient; or in a combination of these and other ways.

The virtual book readings 910 are initially presented to the recipient according to a default organization. The default organization may be selected by a system administrator and/or the recipient (e.g., as part of a web site profile). The recipient can select one of a plurality of controls 925 in order to sort the virtual book readings 910 according to another organization. For example, the controls 925 may allow the user to sort the virtual book readings 910 according to title, date, the user (or invited reader) who recorded the virtual book reading, and/or other feature. In addition, the recipient can type one or more alphanumeric characters into a search box 920 to find one or more virtual book readings 910 with a particular title, user and/or reader, category, length, and/or other feature.

In some embodiments, when a recipient indicates an interest in the virtual book reading 910, such as by hovering a cursor or selecting a virtual book reading using the input device 150, the user interface 900 displays additional information about the virtual book reading. For example, the user interface 900 may display a pop up window, balloon, and/or other feature that displays a summary of the indicated virtual book reading 910 and/or the virtual book 310 associated with the reading. The summary may include a variety of information, including the name of the user that recorded the virtual book reading 910, a picture of the user that recorded the reading, and/or details about the reading, such as the date the reading was recorded and the length of the reading. The summary may also include information about the associated virtual book 310, such as the title, author, publisher, a synopsis of the story line, length, and/or other information.

The user interface 900 may also include a message area 915 with a description of how to select and/or play a virtual book reading 910, a link to a video demonstration of how to select and/or play a virtual book reading, a link to browse the bookstore of available virtual books 310, a link to a frequently asked questions web page, and/or a variety of other information.

Returning to FIG. 8, at a block 810 the system receives a recipient selection of a virtual book reading 910. The recipient can select a virtual book reading 910 in a variety of well known ways, such as using a mouse, stylus, finger, or other implement to select the virtual book reading.

In some embodiments, the process 800 of FIG. 8 omits block 805 and proceeds directly to block 810. For example, when a notification message is sent to the recipient indicating that a virtual book reading 910 is available, the recipient may select a link in the message to go directly to that virtual book reading. In such embodiments, the system need not first display all available virtual book readings 910 to the recipient.

Once a virtual book reading 910 has been selected by the recipient, such as from a personal bookshelf area 805 or in response to receiving a notification message, at a block 815 the system displays a book reading user interface to the recipient. As described in reference to FIG. 4, the same book reading user interface 400 may be used to generate an audiovisual recording for a virtual book 310 as well as to playback a stored audiovisual recording of the virtual book. In such embodiments, the user interface 400 may include one or more variations in the recording and playback controls, in order to provide a user interface that is more suitable for each implementation.

As previously described, the book reading user interface 400 includes a virtual book viewer 405 that displays the pages of the virtual book 310 associated with the selected virtual book reading 910. Virtual books 310 may be displayed differently by the book viewer 405, based at least in part on the aspect ratio of the virtual book. The book view may be defined by a system administrator, a publisher, a user or recipient, and/or in another manner. In addition, the system may modify the book view when the recipient resizes a browser window containing the client application, as previously described.

As previously described, the book reading user interface 400 may also include a navigation area 410 that displays all or a portion of the pages (or page spreads) of the virtual book 310 associated with the virtual book reading 910. The recipient may navigate from page to page (or page spread to page spread) within the virtual book 310 by selecting a page (or page spread) from the navigation area 410. In some embodiments, the navigation area 410 may be omitted to provide a simpler user interface 400 to the recipient.

Also as previously described, the book reading user interface 400 includes a video display window 415 and a control area 420 having a plurality of recording/playback controls. The video display window 415 presents the audiovisual recording of the user (or invited reader) reading the virtual book 310 aloud. The recording/playback controls allow the recipient to start, stop, pause, and/or otherwise manipulate the audiovisual recording during playback. In some embodiments, the recipient may turn off the video display and just hear an audio portion of the audiovisual recording.

As previously described, the size of the video display window 415 may vary based on whether the user interface 400 is that of the recording or playback implementation. For example, the video display window 415 may be larger in the playback implementation than in the recording implementation, to provide the recipient with a clear view of the user (or invited reader) as he or she reads the virtual book 310 aloud.

In some embodiments, the video display window 415 is displayed at an introductory default size when playback of the audiovisual recording begins. For example, the video display window 415 may initially be displayed at two or three times a normal default size, as the user (or invited reader) introduces the virtual book reading 910 to the recipient. Once the introduction is complete, the video display window 415 may be reduced to a normal default size. The introductory and normal default sizes may be specified by a system administrator, the user or recipient (e.g., via a web site profile option), and/or in another manner.

In some embodiments, the recipient may modify the size of the video display window 415 and/or the book viewer 405, as previously described. As the size of the video display window 415 gets larger, the book viewer 405 may get correspondingly smaller. Similarly, as the size of the video display window 415 gets smaller, the book viewer 405 may get correspondingly larger. The recipient may modify the size of the book viewer 405 in a similar manner. In some embodiments, the video display window 415 may overlap with the book viewer 405 by a portion that does not significantly obscure either the book viewer or the video display window.

In some embodiments, the recipient may zoom in on a portion of the virtual book 310 displayed in the video display window 415. For example, the recipient may want to view a certain word, phrase, image, and/or other feature at a larger resolution. The zooming feature may be especially useful when the virtual book reading 910 is played on a recipient's mobile device, which generally has limited display space. The recipient may zoom in on a portion of the virtual book 310 by using a mouse, finger, or other implement as a magnifying glass; selecting a "zoom in" or "zoom out" control (not shown) presented by the book reading user interface 400; and/or in another manner.

As the audiovisual recording plays in the video display window 415, the stored page synchronization information is used to synchronize the audiovisual recording with the presentation of pages of the virtual book 310. For example, the records 515 stored in the data structure 500 of FIG. 5 may be used to synchronize the audiovisual recording with the turning of pages of the virtual book 310. For instance, a virtual book reading 910 may begin with page (or page spread) 1 of the virtual book 310 displayed at the beginning of the audiovisual recording. In some embodiments, page (or page spread) 1 corresponds to the cover of the virtual book 310. When the audiovisual recording reaches time 0:10.23, the virtual book 310 is turned to page (or page spread) 2, as indicated by record 520. Similarly, when the audiovisual recording reaches time 0:22.41, the virtual book 310 is turned to page (or page spread) 3, as indicated by record 525.

In addition to playing an audiovisual recording from start-to-finish, the recipient can control the portion of the audiovisual recording that is presented by selecting a particular page or page spread. Upon selection of a page (or page spread) by the recipient, the system sets the audiovisual recording to the corresponding time. For example, at any point during the virtual book reading 910, the recipient may select page (or page spread) 3 in order to set the audiovisual recording to time 0:22.41, as indicated by record 525. The recipient may select a particular page by selecting a page from the navigation area 410, selecting a "previous" or "next" arrow 412 displayed by the user interface 400, and/or in another manner.

In some embodiments, as the recipient plays the audiovisual recording, a moving marker, such as a "bouncing ball," highlighting, and/or underlining is displayed in association with the words of the virtual book 310. As previously described, the marker moves in conjunction with the recorded audio of the audiovisual recording, based on stored synchronization information generated using a speech recognition component. In such embodiments, the recipient may also control the portion of the audiovisual recording that is presented by selecting a particular word or phrase. For example, at any point during presentation of the audiovisual recording, the recipient may select a word (or phrase) in order to set the recording to time that corresponds to that word (or phrase), as indicated by the record associated with the word (or phrase). The recipient may select a particular word (or phrase) by clicking on a word (or phrase) of a page of the virtual book 310, selecting a "previous word" or "next word" arrow (not shown) displayed by the user interface 400, and/or in another manner.

In some embodiments, as the recipient plays the virtual book reading 910, the system may play music, sound effects, and/or other audio features corresponding to the virtual book reading and/or associated virtual book 310. The audio features may be automatically leveled based on the audio level of the audiovisual recording. For example, if a volume control is turned to low and/or the user (or invited reader) is speaking softly, the audio features may be played at a lower volume so as not to drown out the user's (or invited reader's) voice.

In some embodiments, as the recipient plays the virtual book reading 910, the system generates and records an audiovisual recording of the recipient as the recipient is enjoying the reading of the virtual book by the user. As described in reference to FIG. 2, if an audiovisual recording has not previously been generated for the recipient and/or the particular client 130 used by the recipient, the system configures the input device(s) 150 of the recipient's client, including a camera and a microphone, to work with the client application 135. As the recipient plays the virtual book reading 910, the camera captures video of the recipient, while the microphone captures audio. While the audiovisual recording of the recipient is being generated, the system may track information that allows the system to synchronize the audiovisual recording of the recipient with the presentation of pages of the virtual book 310. The system may use a data structure similar to data structure 500 (FIG. 5) to record the page synchronization information. Once the audiovisual recording of the recipient has been generated, the system stores the recording in the audiovisual recording database 115.

The audiovisual recording of the recipient may be retrieved from the audiovisual recording database 115 and played back to the user (or invited reader), with or without the original audiovisual recording of the user (or invited reader). Based on the recorded information, the recording(s) are synchronized with the presentation of the pages of the virtual book 310 during playback to the user (or invited reader). Among other benefits, the audiovisual recording of the recipient allows the user (or invited reader) to see the recipient's reaction during the virtual book reading 910. In some embodiments, the original audio of the user (or invited reader) may be played back at a lower volume and at the same time as the audio of the recipient is played back so that the user (or invited reader) is able to better see the correspondence between their reading and the reaction of the recipient.

Returning to FIG. 8, at a decision block 820, the system determines whether a notification is to be sent to the user (and/or invited reader) that the recipient has played the virtual book reading 910. The user (or invited reader) may request such a notification as part of the user's (or invited reader's) web site profile, such as by selecting an "always send me a notification when the recipient has viewed my book" or other profile option. Alternatively or additionally, once the audiovisual recording is complete, the system may present the user (or invited reader) with an option to request a notification when the recipient plays the virtual book recording 910.

Similarly, the recipient may request such a notification as part of the recipient's web site profile, such as by selecting an "always send a notification to the reader" or other profile option. Alternatively or additionally, once playback of the virtual book reading 910 is complete, the system may present the recipient with an option to send a notification to the user (and/or invited reader). In some embodiments, when a user (or invited reader) has requested to be notified when the recipient plays the virtual book reading 910, the system may request authorization from the recipient before the notification is sent.

In some embodiments, during or after playback of the virtual book reading 910, the system displays a link to an online retailer (e.g., Amazon.com, Barnes & Noble, Borders) from which a physical copy of the virtual book 310 may be purchased. The physical copy of the book may be a traditional physical counterpart of the virtual book 310, an enhanced physical book with an embedded video component for playing the audiovisual recording, and/or another type of physical book.

In some embodiments, the recipient need not have a network connection in order to play a virtual book reading 910. In such embodiments, the recipient may download a video (e.g., MPEG) or other file containing the virtual book reading 910. The recipient may download the file from the web site, a link in a notification message, and/or in a variety of other ways. The downloaded file may be played by the recipient without requiring a network connection, such as on an offline computer or mobile device. The downloaded file may be formatted specifically for the type of device on which the recipient intends to play the file. For example, the system may present the recipient with multiple format options, including traditional computer display, mobile device, and/or other formats. The mobile device format may, for instance, make increased use of zooming and/or panning techniques in order to display the virtual book in a manner that is readable by the recipient on a smaller display screen.

Alternatively or additionally, the system may record the file on a physical medium, such as a DVD. The user and/or recipient may order a DVD or other media via the web site, a link in a notification or other message, and/or in a variety of other ways. The DVD or other media may be played by the recipient on an offline computer, including a television connected to a DVD player.

In other embodiments, the user and the recipient may participate in a real-time virtual book reading 910. For example, the user may send to the recipient an invitation to participate in a "live" book reading. In such embodiments, the recipient sees the audiovisual recording as the user is generating the recording. The audiovisual recording may still be recorded, so that it is available for later playback. In addition, during the real-time virtual book reading 910, a video display window of the recipient may be displayed to the user, as described previously, such that the user can see the recipient's reaction to the reading. The video display window of the recipient may be displayed in place of or in addition to the video display window 415 of the user.

In some embodiments, a user and/or recipient may publish a virtual book reading 910 to a public gallery of virtual book readings. The public gallery may be available to any web site visitor, or a web site visitor may be required to log into the web site before viewing the public gallery. Visitors to the public gallery may view, rate, and/or comment on virtual book readings 910 in the public gallery. In addition, visitors may vote on their favorite virtual book readings 910 and/or unpublished virtual books 310 associated with the readings. Votes may be conducted via web site poll, tweet, and/or other mechanism. In some embodiments, vote winners may receive an award. For example, an author of a winning unpublished virtual book 310 may receive an opportunity to have the virtual book published.

5. Conclusion

From the foregoing, it will be appreciated that specific embodiments of the technology have been described herein for purposes of illustration, but that various modifications may be made without deviating from the spirit and scope of the described technology. For example, the described technology may be incorporated into a physical book with embedded video capabilities, a kiosk available at a bookstore or other location, and/or a variety of other embodiments. While FIG. 5 depicts a table whose contents and organization are designed to make them more comprehensible by a human reader, those skilled in the art will appreciate that the actual data structure(s) used by the system to store this information may differ from the table shown, in that they, for example, may be organized in a different manner, may contain more or less information than shown, may be compressed and/or encrypted, and may be optimized in a variety of ways. Those skilled in the art will further appreciate that the depicted flow charts may be altered in a variety of ways. For example, the order of the steps may be rearranged, steps may be performed in parallel, steps may be omitted, or other steps may be included. Accordingly, the technology described herein is not limited except as by the appended claims.

We claim:

1. A system for generating an audiovisual recording of a user reading a virtual book for playback with the virtual book, the system comprising:
    a virtual book database which stores:
        a plurality of virtual books, wherein a virtual book comprises electronic images associated with pages of the virtual book; and
        a view indicator associated with each of the plurality of virtual books, wherein the view indicator specifies how the corresponding virtual book is to be displayed by a client application, and wherein the view indicator is based at least in part on an aspect ratio of the virtual book;
    an audiovisual recording database which stores:
        a plurality of audiovisual recordings, wherein an audiovisual recording comprises an audio and a video record of a user reading a virtual book aloud;
        a book identifier associated with each audiovisual recording, wherein the book identifier specifies the virtual book to which the audiovisual recording corresponds; and
        page synchronization information associated with each audiovisual recording, wherein the page synchronization information enables the corresponding audiovisual recording to be synchronized with the pages of the corresponding virtual book during playback;
    a generation component allowing a user to generate an audiovisual recording of the user reading a corresponding virtual book for playback with the virtual book; and
    a web application server coupled to the virtual book database and the audiovisual recording database, wherein the web application server transmits an audiovisual recording and a virtual book to the client application for display to a recipient so that the audiovisual recording of the user reading the virtual book aloud and the pages of the corresponding virtual book are concurrently displayed to the recipient, the video record of the audiovisual recording being displayed in a first display section and the virtual book being displayed in a second display section.

2. The system of claim 1 wherein at least one of the plurality of virtual books is a children's book.

3. The system of claim 1 wherein at least one of the plurality of virtual books has a physical counterpart, and wherein the images of the at least one virtual book are obtained by scanning pages of the physical counterpart.

4. The system of claim 1 wherein at least one of the plurality of virtual books has a physical counterpart, and wherein the images of the at least one virtual book are obtained by rendering design files used to produce the physical counterpart.

5. The system of claim 1 wherein at least one of the plurality of virtual books does not have a physical counterpart, and wherein the images of the at least one virtual book are created in electronic form using an electronic multimedia program.

6. The system of claim 1 wherein the client application is accessible via a web browser of the recipient.

7. The system of claim 1 wherein the client application is a standalone application of the recipient.

8. The system of claim 1 wherein the client application is used in a mobile device.

9. The system of claim 1 wherein the transmitted virtual book is rendered by the client application at run time.

10. A method in a computer system of storing an audiovisual recording of a user reading a virtual book for playback with the virtual book, the method comprising:
    displaying via a display device of a computer system one or more virtual books;
    receiving via the computer system a user selection of one of the displayed virtual books;
    displaying via the display device:
        the selected virtual book, where an amount of the selected virtual book that is displayed is based on an aspect ratio of the selected virtual book; and
        a video window configured to display a live image of the user reading the selected virtual book aloud as an audiovisual recording of the user is being generated, wherein the selected virtual book and the video window are concurrently displayed; and
    storing by the computer system the audiovisual record of the user reading the selected virtual book aloud, wherein the storing comprises, for each page of the selected virtual book:
        receiving from the user a selection of a page of the selected virtual book;
        receiving audiovisual data comprising an audio record and a video record of the user reading the selected page aloud;
        storing the received audiovisual data; and
        storing synchronization information that enables the selected page to be presented in synchronization with the received audiovisual data during playback.

11. The method of claim 10 wherein the selected virtual book is a children's book.

12. The method of claim 10 wherein the selected virtual book is displayed via a web browser, and wherein the display of the selected virtual book is modified if the user resizes the web browser.

13. The method of claim 10 wherein the method further comprises:
    displaying via the display device one or more objects selectable by the user for incorporation into the display of the virtual book.

14. The method of claim 13 wherein the method further comprises:
- receiving from the user a selection of an object for incorporation into the display of the selected virtual book;
- storing an indication of the selected object; and
- storing synchronization information that enables the selected object to be presented in synchronization with the received audiovisual data during playback.

15. The method of claim 10 wherein the synchronization information comprises an indication of the selected page and an indication of a current time in the audiovisual recording.

16. The method of claim 10 wherein the user has been invited by another user to read the virtual book.

17. The method of claim 10 wherein the amount of the selected virtual book that is displayed is also based on a size of the display device.

18. A method in a computer system of playing back an audiovisual recording along with a presentation of a virtual book, the method comprising:
- receiving by a computer system a user selection of a virtual book reading, wherein the virtual book reading comprises an audiovisual recording and a virtual book, and wherein the audiovisual recording comprises an audio portion and a video portion of another user reading the virtual book aloud;
- displaying via a display device of the computer system the audiovisual recording and the virtual book, wherein the audiovisual recording and the virtual book are concurrently displayed such that the video portion of the audiovisual recording is displayed in a first display section and the virtual book is displayed in a second display section; and
- presenting via the display device pages of the virtual book, wherein the pages of the virtual book are presented in synchronization with the audiovisual recording, and wherein the pages of the virtual book are selectable by the user to control a portion of the audiovisual recording that is presented.

19. The method of claim 18 wherein an amount of the virtual book that is displayed is based at least in part on an aspect ratio of the virtual book.

20. The method of claim 19 wherein if the virtual book has a first aspect ratio, its pages are presented one at a time, and wherein if the virtual book has a second aspect ratio, its pages are presented two at a time.

21. The method of claim 18 wherein the displayed audiovisual recording is resizable by the user.

22. The method of claim 21 wherein if the user increases the size of the first display section, the second display section is decreased in size, and
wherein if the user decreases the size of the first display section, the second display section is increased in size.

23. The method of claim 18, wherein the first display section automatically increases in size when an introduction portion of the audiovisual recording is displayed, and the first display section automatically decreases in size when the introduction portion ends.

24. The method of claim 23, wherein the first portion is an introduction to the virtual book by the other user.

25. The method of claim 18, further comprising:
- displaying a marker in association with text contained on the pages of the virtual book, wherein the marker identifies portions of the text and moves in synchronization with the audiovisual recording.

26. The method of claim 18, further comprising:
- generating a second audiovisual recording, wherein the second audiovisual recording comprises a record of the user as the audiovisual recording and the virtual book are displayed; and
- recording the second audiovisual recording.

27. The method of claim 18 wherein the audiovisual recording and the virtual book are displayed in real time or near real time as the other user reads the virtual book aloud.

28. The method of claim 18, further comprising:
- transmitting to a computer system of the other user a notification that the audiovisual recording and the virtual book have been displayed to the user.

\* \* \* \* \*